United States Patent [19]
Codina et al.

[11] Patent Number: 5,438,261
[45] Date of Patent: Aug. 1, 1995

[54] INDUCTIVE SENSING APPARATUS FOR A HYDRAULIC CYLINDER

[75] Inventors: George Codina, North Hollywood, Calif.; Thomas M. Baker, Peoria, Ill.; Lisa A. Creger, Metamora; J. Thomas Vachon, Peoria, both of Ill.

[73] Assignee: Caterpillar Inc., Peoria, Ill.

[21] Appl. No.: 197,624

[22] Filed: Feb. 16, 1994

[51] Int. Cl.⁶ .................... G01B 7/14; G01P 3/50; F01B 25/04; H01F 21/00
[52] U.S. Cl. ............... 324/207.16; 92/5 R; 324/207.22; 324/207.24; 324/176; 336/20; 336/45
[58] Field of Search ........ 324/207.15, 207.16, 324/207.17, 207.18, 207.19, 207.22, 207.24, 236, 160, 163, 176; 92/5 R; 336/20, 45, 130, 136, 137

[56] References Cited
U.S. PATENT DOCUMENTS

| 2,448,296 | 8/1948 | Cary, Jr. ................ 171/242 |
| 2,563,413 | 8/1951 | Ostrow .................. 171/242 |
| 3,302,108 | 1/1967 | Murphy . | |
| 3,654,549 | 4/1972 | Maurer et al. . | |
| 4,085,395 | 4/1978 | Weisenburger ......... 336/20 |
| 4,577,509 | 3/1986 | Moser ............... 324/207.19 X |
| 4,631,478 | 12/1986 | Knetsch et al. ....... 324/207.16 |
| 5,233,293 | 8/1993 | Huang et al. ......... 324/207.15 |

FOREIGN PATENT DOCUMENTS

| 3303738 | 8/1984 | Germany ............ 324/207.16 |
| 2115929 | 9/1983 | United Kingdom .... 324/207.16 |

Primary Examiner—Gerard R. Strecker
Attorney, Agent, or Firm—David M. Masterson

[57] ABSTRACT

In one aspect of the present invention, an apparatus for determining an extended length of a hydraulic cylinder is disclosed. A piston and rod are contained within a cylindrical housing of the hydraulic cylinder. A coil is wound about the rod and is attached to the piston and an end of the cylindrical housing. The coil extends and retracts with the reciprocating movement of the piston. An oscillator is coupled to the coil and produces a position signal in response to the inductance of the coil. A circuit receives the position signal, and determines the incremental linear position and velocity of the piston and rod relative to the housing in response to the frequency of the position signal.

7 Claims, 3 Drawing Sheets

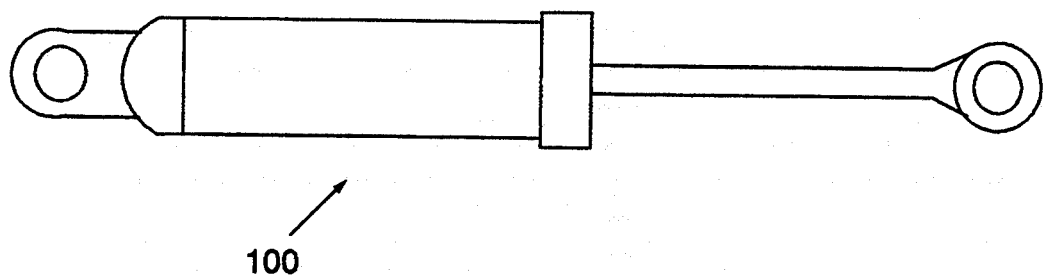
Fig_1_
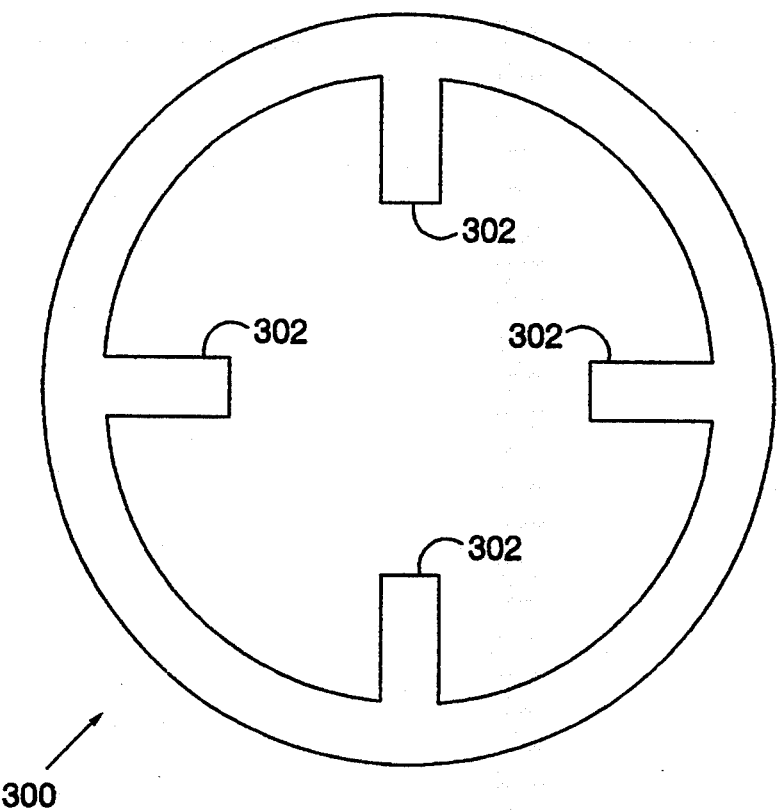
Fig_3_

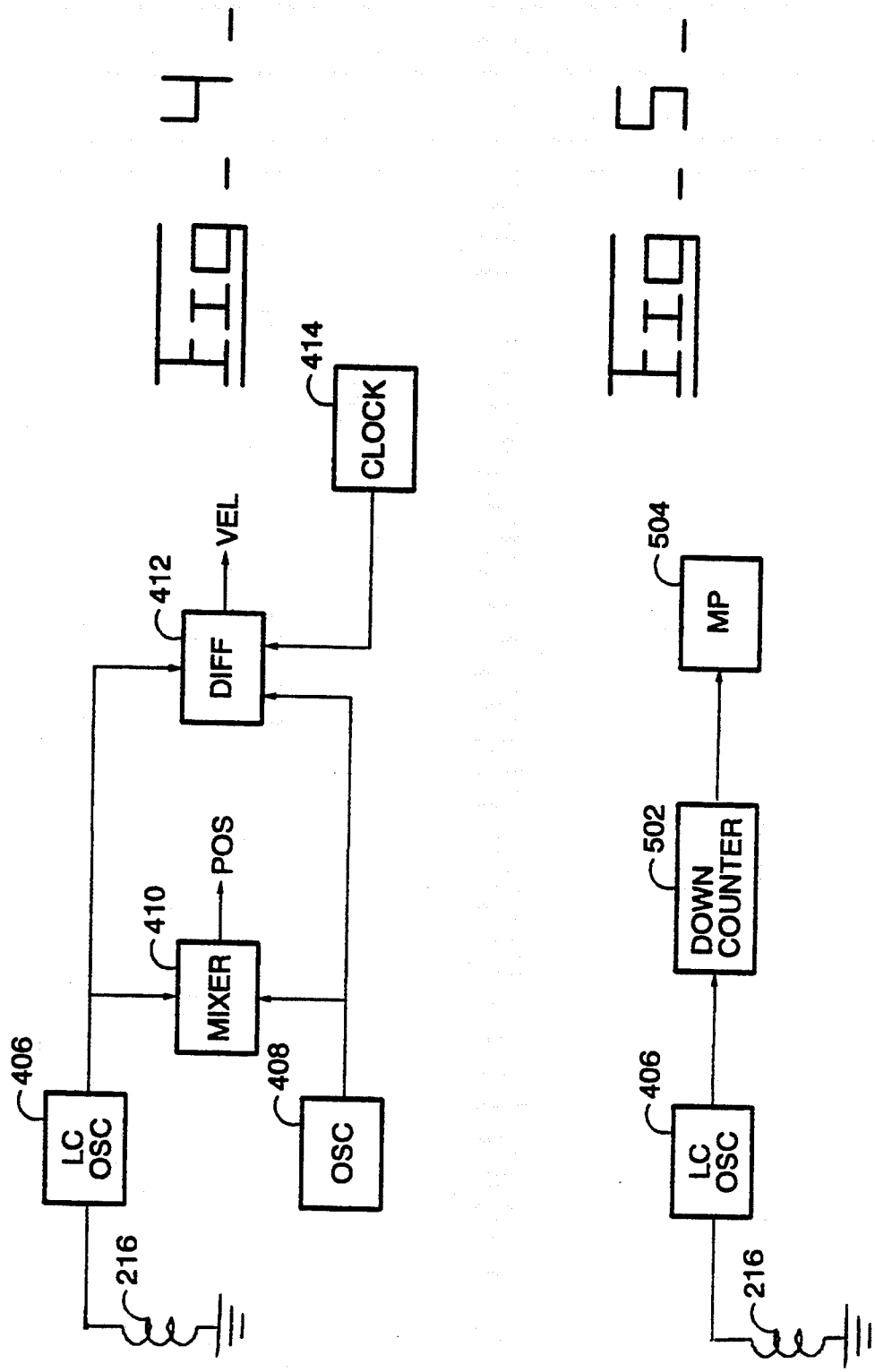

INDUCTIVE SENSING APPARATUS FOR A HYDRAULIC CYLINDER

TECHNICAL FIELD

This invention relates generally to a linear position sensor for a hydraulic cylinder and, more particularly, to a linear position sensor for a hydraulic cylinder that uses inductive sensing techniques.

BACKGROUND ART

In the field of hydraulic cylinders, a variety of systems have been proposed in which the displacement of the elements of the cylinder is electrically sensed and displayed or used to perform control functions. Conventional transducers have serious deficiencies owing in part to difficulties in mounting the units and the harsh environmental conditions to which they are exposed. Transducers used on hydraulic systems in the heavy equipment industry are particularly subject to damage from the severe work environment. Hydraulic cylinders are typically located in relatively unprotected areas and subjected to, for example, high g-forces, wide temperature variations, dust, water, debris, etc., which can result in both electrical and mechanical failure of the sensor.

The present invention is directed to overcoming one or more of the problems as set forth above.

DISCLOSURE OF THE INVENTION

In one aspect of the present invention, an apparatus for determining an extended length of a hydraulic cylinder is disclosed. A piston and rod are contained within a cylindrical housing of the hydraulic cylinder. A coil is wound about the rod and is attached to the piston and an end of the cylindrical housing. The coil extends and retracts with the reciprocating movement of the piston. An oscillator is coupled to the coil and produces a position signal in response to the inductance of the coil. A circuit receives the position signal, and determines the incremental linear position of the piston/rod assembly relative to the housing in response to the frequency of the position signal.

BRIEF DESCRIPTION OF THE DRAWINGS

For a better understanding of the present invention, reference may be made to the accompanying drawings in which:

FIG. 1 shows a hydraulic cylinder;

FIG. 3 shows a retainer associated with the present invention;

FIG. 4 shows a block diagram of one embodiment of the electrical circuitry associated with the present invention; and FIG. 5 shows a block diagram of another embodiment of the electrical circuitry associated with the present invention.

BEST MODE FOR CARRYING OUT THE INVENTION

Figure 2:
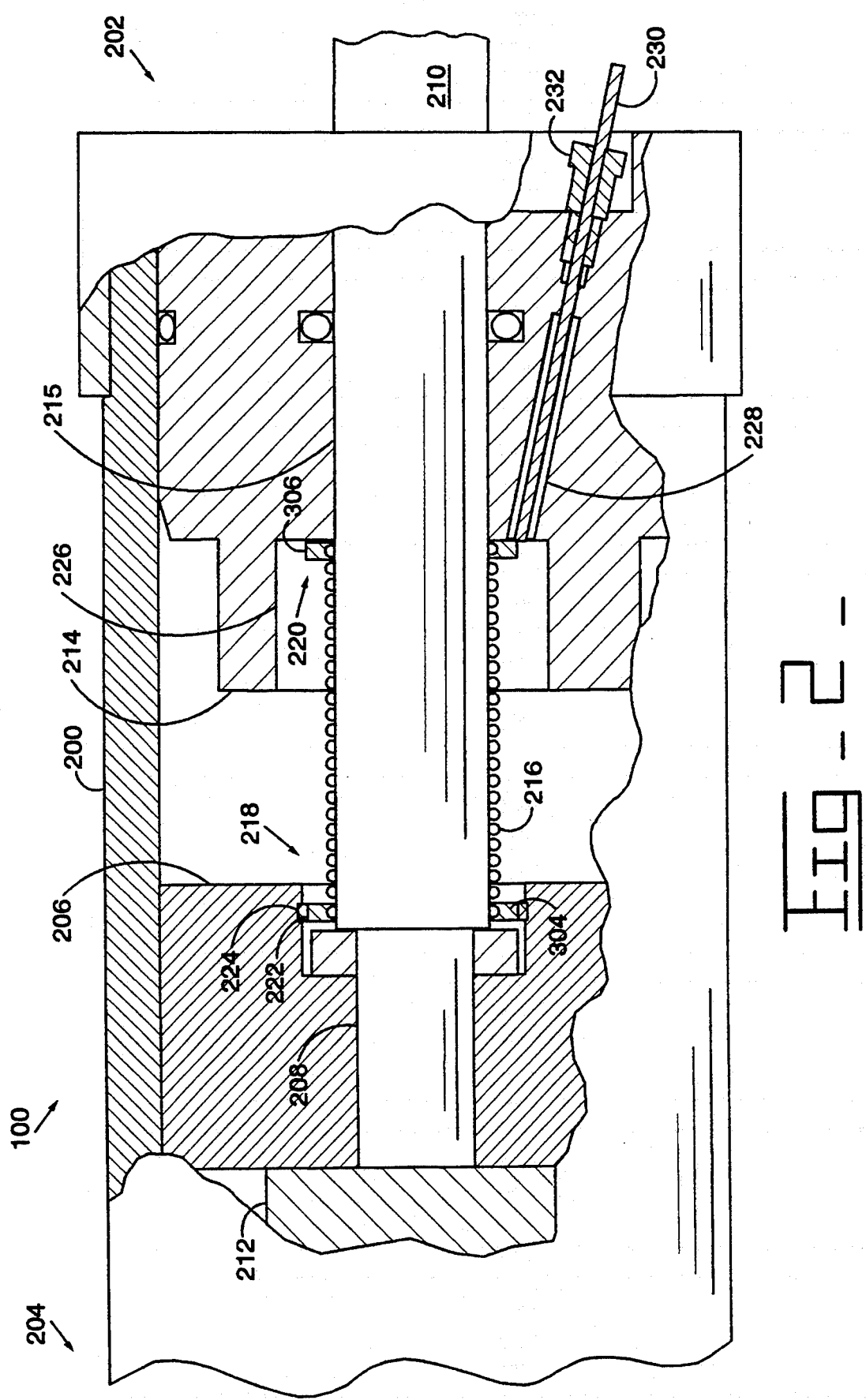
FIG. 2 shows cutaway view of the hydraulic cylinder that illustrates the present invention.

The present invention is adapted to determine an extended length of a hydraulic cylinder 100, as shown in FIG. 1. The hydraulic cylinder 100 may be used to provide the muscle to control a work implement of a construction machine.

A preferred embodiment of the present invention is particularly shown with reference to FIG. 2. The hydraulic cylinder 100 includes a cylindrical housing 200 having opposing ends 202,204. A piston 206 is disposed within the housing 200. In response to pressurized hydraulic fluid, the piston 206 moves reciprocatingly within the cylindrical housing 200. The piston 206 includes a longitudinal bore 208 for reception of a rod 210. The rod 210 is attached to the piston 206 by a nut 212 or by other suitable means. The piston 206 moves the rod 210 in a well known manner.

A cylinder head 214 is disposed at an end 202 of the cylindrical housing 200. The cylinder head 214 defines a longitudinal bore 215 wherein the rod 210 extends therethrough.

The present invention detects the position of the piston 206 relative to the cylinder head 214 for the purpose of either directly displaying the detected position or for use in a system which seeks to control the position of a work implement, for example.

A coil 216 is wound about the rod 214. The coil 216 may be manufactured from "music wire", for example. Music wire is a high carbon, low alloy steel with a smooth finish. The wire may have a gauge of 25 to 32 with 16-24 turns for a hydraulic cylinder having a stroke of 519 mm, for example. As will become apparent to those skilled in the art, the dimensions of the coil are dependent upon the stroke of the hydraulic cylinder, the desired strength and number of turns of the coil. The values shown herein are for exemplary purposes only.

The coil 216 may be coated with an epoxy to electrically isolate the coil 216 from the rod 214. For example, a suitable coating may include an epoxy resin manufactured by Dow Chemicals of Midland, Mich., as product no. DER331 mixed with a polysebasic polyanhydride (PSPA) manufactured by Cambridge Industries of America of Newark, N.J. However, any other suitable non-conductive coating may be used.

One end 218 of the coil 216 is attached to the piston 206 and the other end 220 of the coil 216 is attached to the cylinder head 214. The coil 216 is attached to piston 206 and cylinder head 214 by a retainer 300 shown in FIG. 3. As shown, the retainer 300 has four extensions 302. The extensions 302 are folded over the coil's last set of turns.

Adverting back to FIG. 2, one retainer 304 is attached to the piston 206 via a snap ring 222 that resides in a counter bore 224. The retainer 304 is manufactured from spring steel. The last set of turns is not coated with an electrically non-conductive material to provide an electrical connection between the coil 216 and piston 206.

The other retainer 306 is attached to the cylinder head 214 via a set of screws (not shown). The retainer 306 is manufactured of a polyurethane to electrically isolate the coil 216 from the cylinder head 214. Accordingly, the coil 216 extends and contracts, while following the movement of the piston 206.

As shown, the cylinder head 214 defines a counter bore 226 which is coaxial to the longitudinal bore 215. The counter bore 226 shields the coil 216 from the other members of the hydraulic cylinder 100 when the rod 214 is fully extended, i.e., when the piston 206 is abutted against the cylinder head 214. The counter bore 226 has sufficient depth to house a fully stacked coil 216.

The cylinder head 214 further defines a diagonal bore 228 to allow the coil 216 to establish a single lead 230 for connection to external electronic circuitry. The lead 230 is adjusted via a set screw 232.

Because the dimensions, i.e., number of turns per unit length, of the coil 216 changes as the piston 206 moves, the coil 216 may be used as a variable inductor in a resonant circuit in order to determine the extension of the hydraulic cylinder 100. One embodiment of the external circuitry associated with the present invention is shown with reference to FIG. 4.

A power supply (not shown) delivers electrical energy to the circuit components. The power supply may deliver voltages from 5 to 15 volts.

The coil 206 is connected to a standard LC-type oscillator 406 that produces a sinusoidal waveform. In response to the inductance of the coil 216, the oscillator 406 produces a position signal having a variable frequency from 1 to 10 MHz for an inductance range of 20 to 50 nH, for example. The position signal is representative of the linear position of the piston relative to the cylinder head 214. A suitable oscillator 406 may include a Colpitts oscillator, which is well known in the art.

A fixed frequency oscillator 408 produces a reference signal. A mixer 410 receives the position signal and reference signal, and modifies the frequency of the position signal. For example, the mixer 410 lowers the frequency of the position signal to a more manageable frequency in a well known manner.

Finally, a differentiator 412 receives the position and reference signal, along with a clock signal produced by a clock 414. The differentiator 412 differentiates the position signal and produces a velocity signal that is representative of the velocity of the piston relative to the cylinder head 214.

Another embodiment of the external circuitry associated with the present invention is shown with reference to FIG. 5. As shown, a down counter 502 receives and modifies the position signal. For example, the down counter 502 lowers the position signal to a frequency range from 5 to 10 KHz. A microprocessor 504 receives the modified position signal and determines its frequency. In response to the position signal frequency, the microprocessor 504 determines the incremental linear position of the piston and/or rod relative to the cylinder head 214. Once the positional information is determined, the microprocessor 504 numerically differentiates the position signal and produces a velocity signal which is representative of the velocity of the piston relative to the cylinder head.

Preferably the microprocessor 504 includes ROM which stores empirically determined data that relates a plurality of frequencies to a plurality of cylinder extensions and velocities. For example, the microprocessor receives the position signal and retrieves the stored characteristics from the ROM and compares the characteristics to the representative signal to determine the position of the rod relative to the cylinder head. A two-dimensional look-up table of a type well-known in the art may be used to complete the comparison and select the value.

The circuitry shown in FIGS. 4-5 are exemplary, and the manner of design and construction of this, or a similar, circuit would be commonly known to a person skilled in the art.

Thus, while the present invention has been particularly shown and described with reference to the preferred embodiment above, it will be understood by those skilled in the art that various additional embodiments may be contemplated without departing from the spirit and scope of the present invention.

For example, the present invention may be used to determine the linear position of an electromagnetic strut assembly used in an active suspension system of a motor vehicle. The strut assembly is an equivalent structure to the hydraulic cylinder assembly described above. In this example, the coil spring of the strut assembly may be used as the variable inductor.

The present invention may also be used to determine the linear position of a spool associated with a hydraulic spool valve. The spool is an equivalent structure to the piston/rod assembly described above. The return spring(s) of the spool valve may be used as the variable inductor.

Thus, the principles described above may be used to determine the linear position and velocity of a strut assembly or hydraulic spool valve.

INDUSTRIAL APPLICABILITY

In the overall operation of the present invention, assume that the piston rod 210 of the hydraulic cylinder 100 is connected to a work implement of a construction machine, such as the blade of a bulldozer, for example. A control system seeks to maintain the height of the bulldozer blade at an optimum position to maximize the work performed by the bulldozer. The use of modern control theory allows the control to monitor various operating parameters and apply a properly weighted PID equation to continuously adjust the height of the blade and effect optimal control. Proper feedback of the height of the blade is necessary to govern the blade position in a stable manner. The position feedback must necessarily be of a relatively high accuracy and is provided by the present invention.

Operation of the present invention is based upon the similarities exhibited between the amount of extension of the coil 216 and the inductance of the coil 216. Because the coil inductance is part of an LC-type oscillator 406, the frequency of the signal produced by the oscillator 406 is proportional to the inductance of the coil 216. From this principle, by determining the frequency of the position signal the extension of the rod 210 can be derived and hence, the position of the work implement is directly proportional to the position signal frequency.

Known linear position sensors suffer from inaccuracies owing to severe environmental conditions, such as shock, temperature and humidity. Physical damage to sensors exposed to rugged work conditions is a limiting factor in the expected life of the sensors used, for example, in the heavy equipment industry. The present invention is particularly suited for use in the heavy equipment industry for detecting the extended length of hydraulic cylinders as it is highly insensitive to environmental conditions and protected from the work environment. The present invention is adapted to be retrofitted in existing hydraulic cylinders with little customization and/or retooling of the hydraulic cylinder.

Other aspects, objects and advantages of the present invention can be obtained from a study of the drawings, the disclosure and the appended claims.

We claim:

1. An apparatus for determining an extended length of a hydraulic cylinder, comprising:

a cylindrical housing having opposing ends;

a piston having reciprocating movement within the cylindrical housing;

a rod being attached to and moveable with the piston;

a coil wound about the rod having one end attached to the piston, the coil extending and retracting with the reciprocating movement of the piston;

a cylinder head disposed at an end of the cylindrical housing, the coil having the other end attached to the cylinder head, the cylinder head defining a longitudinal bore for reception of the rod and a counter bore coaxial to the longitudinal bore to house the coil;

an oscillator circuit coupled to the coil, the oscillator circuit producing a position signal in response to the inductance of the coil;

means for receiving the position signal, and determining the incremental linear position of the piston or rod relative to the housing in response to the frequency of the position signal.

2. An apparatus, as set forth in claim 1, including means for receiving the position signal, differentiating the position signal, and determining the linear velocity of the piston or rod relative to the housing in response to the frequency of the differentiated position signal.

3. An apparatus, as set forth in claim 2, wherein the coil is coated with an epoxy to electrically isolate the coil from the rod.

4. An apparatus, as set forth in claim 3, wherein the coil and piston interface establishes a ground connection.

5. An apparatus, as set forth in claim 4, wherein the coil has a single lead extending from the cylindrical housing to establish an electrical connection.

6. An apparatus, as set forth in claim 2, wherein the oscillator circuit is a Colpitts oscillator.

7. An apparatus, as set forth in claim 6, wherein a microprocessor receives the position signal and determines the position and velocity of the piston or rod relative to the housing in response to the frequency of the position signal.

* * * * *